US007417521B2

(12) United States Patent
Marukawa et al.

(10) Patent No.: US 7,417,521 B2
(45) Date of Patent: Aug. 26, 2008

(54) BATTERY PACK

(75) Inventors: Shuhei Marukawa, Toyohashi (JP); Makoto Umeda, Ibaraki (JP); Masahiro Misu, Nissin (JP); Kunio Kanamaru, Okazaki (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 0 days.

(21) Appl. No.: 11/837,408

(22) Filed: Aug. 10, 2007

(65) Prior Publication Data

US 2008/0068116 A1 Mar. 20, 2008

(30) Foreign Application Priority Data

Sep. 19, 2006 (JP) ............................ 2006-253272

(51) Int. Cl.
*H02J 7/00* (2006.01)

(52) U.S. Cl. ....................... 335/202; 180/68.5; 320/112

(58) Field of Classification Search ................. 335/202; 180/68.5; 320/112, 113
See application file for complete search history.

(56) References Cited

U.S. PATENT DOCUMENTS

| | | | | |
|---|---|---|---|---|
| 1,523,423 | A * | 1/1925 | Hoge | 335/252 |
| 2,609,171 | A * | 9/1952 | Knapp et al. | 248/574 |
| 3,863,881 | A * | 2/1975 | Fletcher et al. | 248/634 |
| 2007/0108939 | A1* | 5/2007 | Miyagi et al. | 320/112 |

FOREIGN PATENT DOCUMENTS

| | | | |
|---|---|---|---|
| JP | 2005-328597 | A | 11/2005 |
| JP | 2000-164097 | A * | 6/2006 |

* cited by examiner

*Primary Examiner*—Ramon M Barrera
(74) *Attorney, Agent, or Firm*—Christensen O'Connor Johnson Kindness PLLC

(57) ABSTRACT

Noise generated by driving a relay provided on a battery pack is suppressed. A negative relay is fixed onto top of a bottom face and an inner side surface of a lower case of the battery pack via multiple mounting points formed on an L-shaped fixture. The center of gravity of the negative relay is located within a polygon having the mounting points as vertices.

4 Claims, 6 Drawing Sheets

BATTERY PACK

PRIORITY INFORMATION

This application claims priority to Japanese Patent Application No. 2006-253272 filed on Sep. 19, 2006, which is incorporated herein by reference in its entirety.

BACKGROUND OF THE INVENTION

1. Field of the Invention

The present invention relates to a battery pack to be mounted in a vehicle, and more particularly to the position of a relay to be housed in the battery pack.

2. Description of the Related Art

Heretofore, hybrid electric vehicles and fuel cell vehicles as well as electric vehicles were equipped with a battery pack for storing electric power to supply a drive motor. The battery pack includes a battery stack formed by combining multiple battery modules, various devices to control the battery stack, and an upper case and a lower case to protect the battery stack and the various devices. One example of the various devices disclosed in Japanese Patent Laid-Open Publication No. 2005-328597 is a relay for disconnecting as necessary the electric power that is supplied from the battery stack to the drive motor.

FIGS. 6A, 6B, and 6C illustrate the operating principle of the relay. A relay 1 is, for example, attached to a top of a bottom face 14*a* of a lower case 14 by a mounting screw 2*a* via a fixture 2. The relay 1 is a so-called mechanical relay and has an excitation coil 1*a*, a movable core (drive shaft) 1*b* that moves by electromagnetic force of the excitation coil 1*a*, and a case 1*d* for storing the excitation coil 1*a*, the movable core 1*b*, and so forth.

In FIG. 6A, when the relay 1 turns on, the excitation coil 1*a* is energized to generate electromagnetic force. As a result, as shown in FIG. 6B, the movable core 1*b* rises, a return spring 1*e* is compressed, and an internal contact terminal 1*c* provided on the top of the movable core 1*b* contacts an external input terminal 3*a* and external output terminal 3*b* so that the external input terminal 3*a* and the external output terminal 3*b* are electrically connected via the internal contact terminal 1*c*. Furthermore, when the relay 1 turns off, the electromagnetic force of the excitation coil 1*a* dissipates, the movable core 1*b* falls due to the return force of the contracted return spring 1*e*, and the internal contact terminal 1*c* separates from the external input terminal 3*a* and the external output terminal 3*b* so that the external input terminal 3*a* and the external output terminal 3*b* are electrically disconnected.

When the relay 1 changes from the on state to the off state, as shown in FIG. 6C, the movable core 1*b* impacts the bottom face of the case 1*d* due to the return force of the return spring 1*e* and the impact vibrations are transmitted to the entire relay 1. The impact vibrations are transmitted to the lower case 14 via the mounting point 2*b* and may vibrate the battery pack to generate noise.

The quietness of equipment mounted in a vehicle is an important factor on which the product value of the equipment can be judged. Thus, it is preferable for the impact sound generated from the relay provided in the battery pack to be dampened.

Heretofore, to dampen the shock generated during the sliding operation of the movable core 1*b*, dampening was applied by attaching the relay 1 and the fixture 2 via a shock absorbing member 4 (rubber cushion).

SUMMARY OF THE INVENTION

As described hereinabove, even if the relay 1 is attached to the top of the bottom face 14*a* via the fixture 2 and the shock absorbing member 4, when the shock absorbing member 4 absorbs shock during the sliding operation of the movable core 1*b*, a force is newly generated and vibrates the relay 1 in a direction parallel to the top of the bottom face 14*a*. The relay 1 vibrates due to this force and noise may be generated.

It is therefore an object of the present invention to suppress the noise that is generated from driving the relay that is provided in the battery pack.

A battery pack relating to the present invention is a battery pack mounted in a vehicle and includes a battery pack, a relay unit for relaying current output from the battery pack, and a case for housing the battery pack and the relay unit. The relay unit has at least three mounting points for securing at least two inner surfaces of the case via a shock absorbing member, and the center of gravity of the relay unit is located inside a polygon having the mounting points as vertices.

According to one aspect of the present invention, the center of gravity of the polygon and the center of gravity of the relay unit coincide.

According to one aspect of the present invention, the relay unit includes a mechanical relay for opening and closing contacts by a drive shaft sliding in a shaft direction. The inner surface to which the relay unit is fixed includes a surface perpendicular with the shaft direction and a surface parallel to the shaft direction. A quantity of mounting points for fixing to the surface parallel to the shaft direction is greater than a quantity of mounting points for fixing to the surface perpendicular to the shaft direction.

According to one aspect of the present invention, the relay unit includes an L-shaped fixture and is fixed to an inner surface of the case via the fixture.

According to the present invention, the noise generated by driving the relay provided in the battery pack can be suppressed.

DETAILED DESCRIPTION OF THE PREFERRED EMBODIMENTS

The preferred embodiment (hereinafter referred to as the embodiment) of the present invention will be described with reference to the attached drawings.

Figure 1:
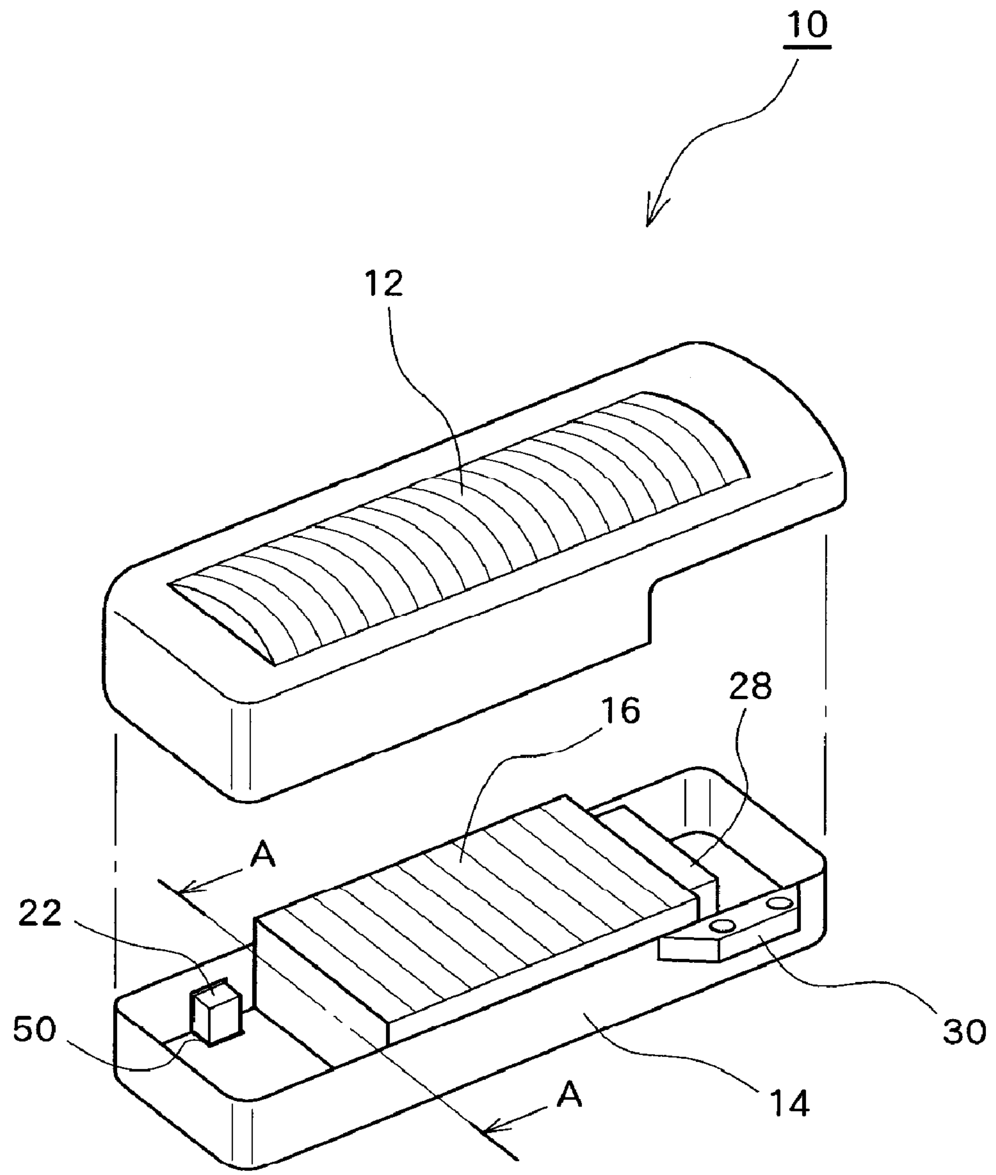
FIG. 1 is an external development view of a battery pack in the embodiment.

FIG. 1 is an external development view of a battery pack 10 in the embodiment. The battery pack 10 is mounted, for example, into a hybrid electric vehicle or fuel cell vehicle or into an electric vehicle and stores electric power to be supplied to a drive motor.

Figure 6A:
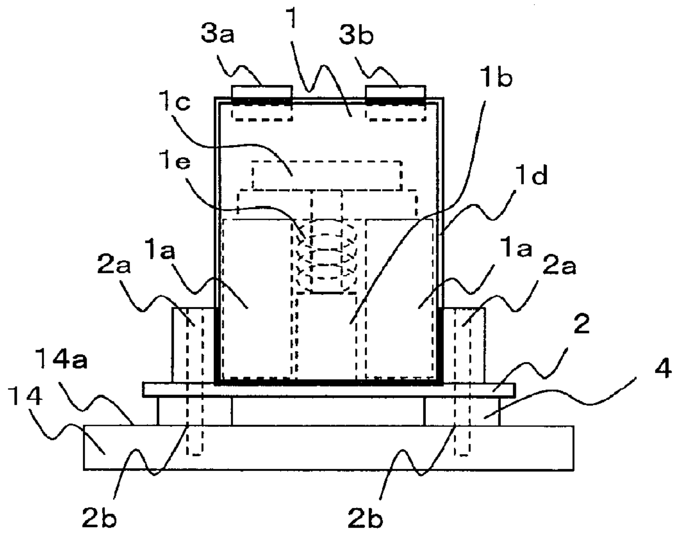
FIG. 6A illustrates the operating principle of the relay.
Figure 6B:
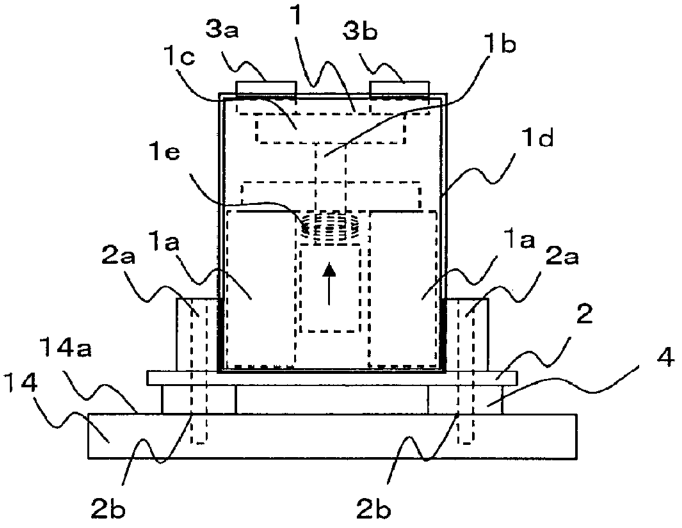
FIG. 6B illustrates the operating principle of the relay.
Figure 6C:
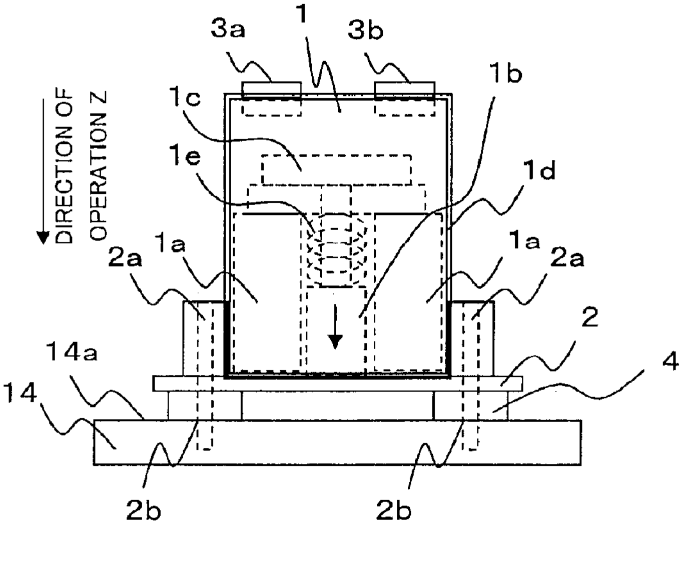
FIG. 6C illustrates the operating principle of the relay.

In FIG. 1, a battery case, which is a case for the battery pack 10, has an upper case 12 for covering the upper part and the lower case 14 for covering the lower part of a battery stack 16 formed from a combination of multiple battery modules. In addition to the battery stack 16, various devices are built into the battery pack 10 including a battery ECU (battery electronic control unit) 28, a positive relay 20 (not shown in FIG. 1), a negative relay 22, a pre-charge relay 24 (not shown in FIG. 1), and a pre-charge resistor 26 (not shown in FIG. 1). Furthermore, to the outer side surface of the lower case 14 is attached an output terminal for charging/discharging 30. The battery stack 16 is connected to the output terminal for charging/discharging 30 via the positive relay 20 and the negative relay 22. The relays in the embodiment are mechanical relays and may be identical to the relay 1 shown in FIGS. 6A to 6C mentioned above so that details on the internal construction and operating principle of the relays are omitted.

Figure 2:
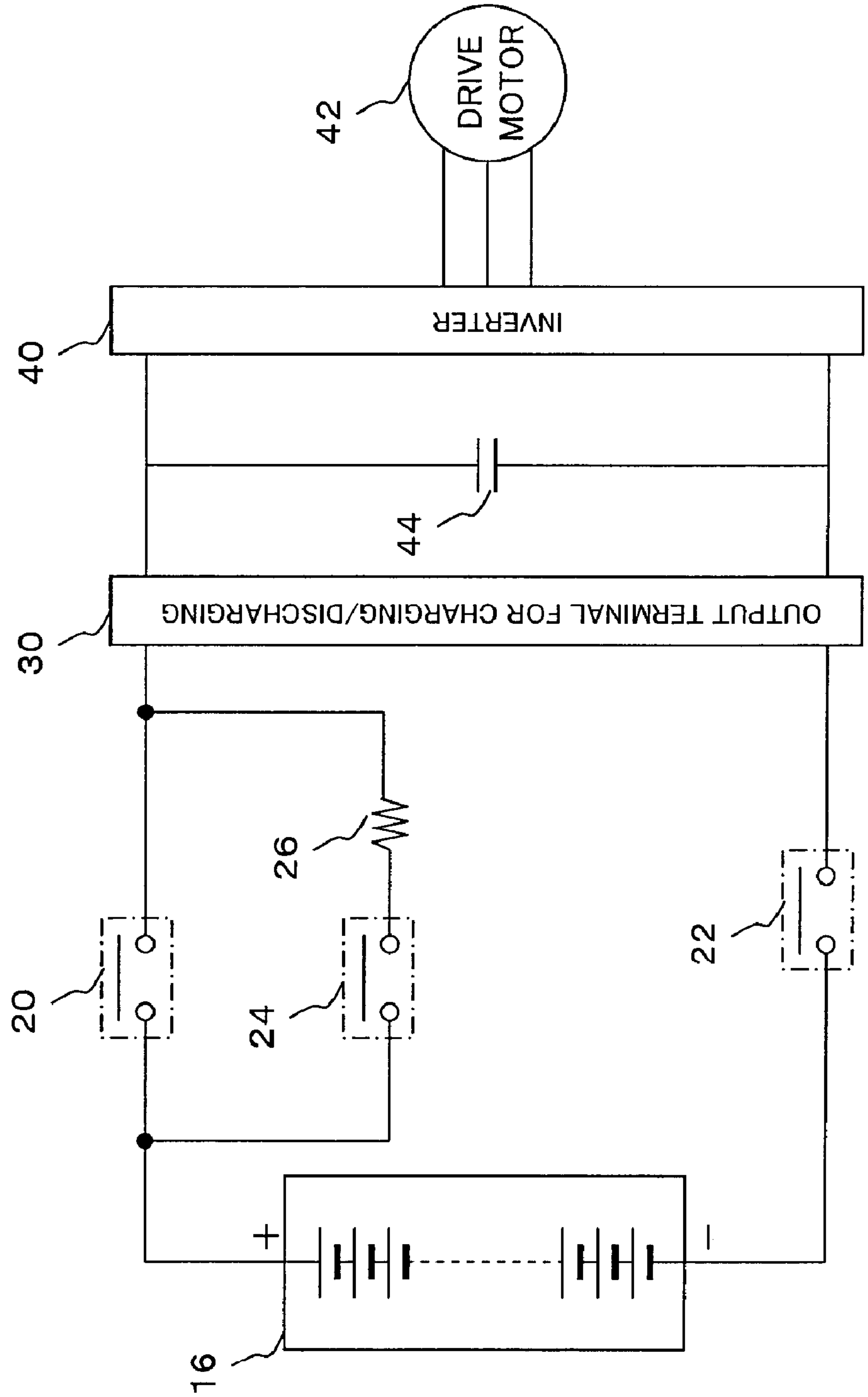
FIG. 2 is a block diagram of a drive system for driving a drive motor from electric power supplied from the battery pack.

FIG. 2 is a block diagram of a drive system for driving a drive motor 42 from electric power supplied from the battery pack 10.

In FIG. 2, a direct current that is output from the battery stack 16 is converted into alternating current via an inverter 40 and supplied to the drive motor 42. Between the battery stack 16 and the inverter 40 are provided the positive relay 20, the negative relay 22, and the pre-charge relay 24. When an ignition key in the vehicle is used to turn on an ignition system, the negative relay 22 and the pre-charge relay 24 turn on in sequence and charging of a capacitor 44 begins. At this time, any large inrush current flowing to the positive relay 20 is limited by the current-limiting pre-charge resistor 26. After the capacitor 44 is charged, the positive relay 20 turns on, a supply to a drive circuit for the drive motor 42 begins, and the pre-charge relay 24 turns off. When the ignition system is turned off, the positive relay 20 and the negative relay 22 turn off, and the battery stack 16 and the inverter 40 are electrically disconnected.

Figure 3A:
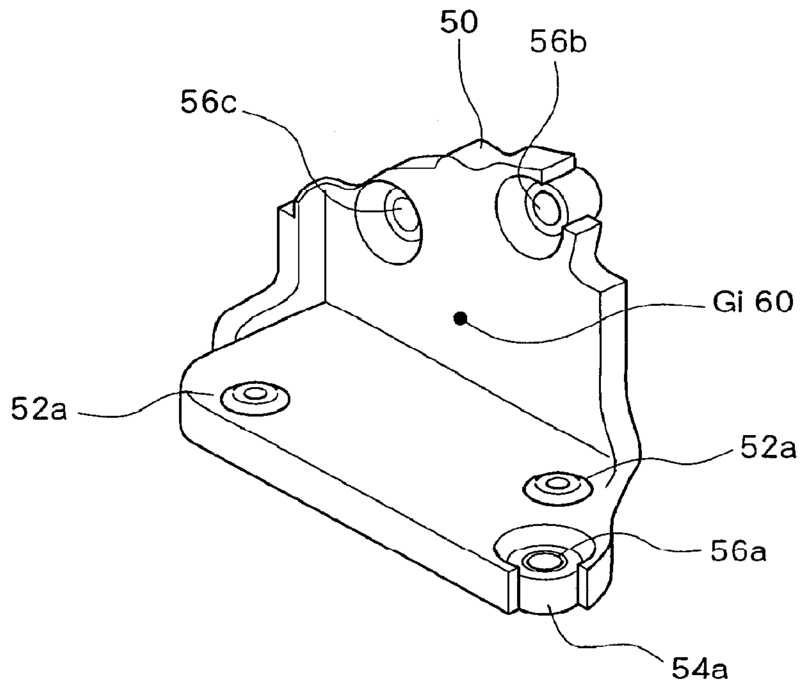
FIG. 3A is a perspective view of a fixture for fixing the relay to the lower case.

FIG. 3A is a perspective view of a fixture 50 serving as a base when attaching the negative relay 22 to the lower case 14. In the battery pack 10 of the embodiment, the fixture 50 that is fixed to the lower case 14 has a shape shown in FIG. 3A for suppressing noise that is generated from the on/off operation of the relay. Hereinafter, the relay including the fixture will be referred to as a relay unit. In the embodiment, the fixture used to fix the negative relay 22 to the lower case 14 will be described with the device installation space taken into consideration. Provided the device installation space can be ensured, other relays may be attached to the lower case 14 via a fixture having a similar shape.

Figure 3B:
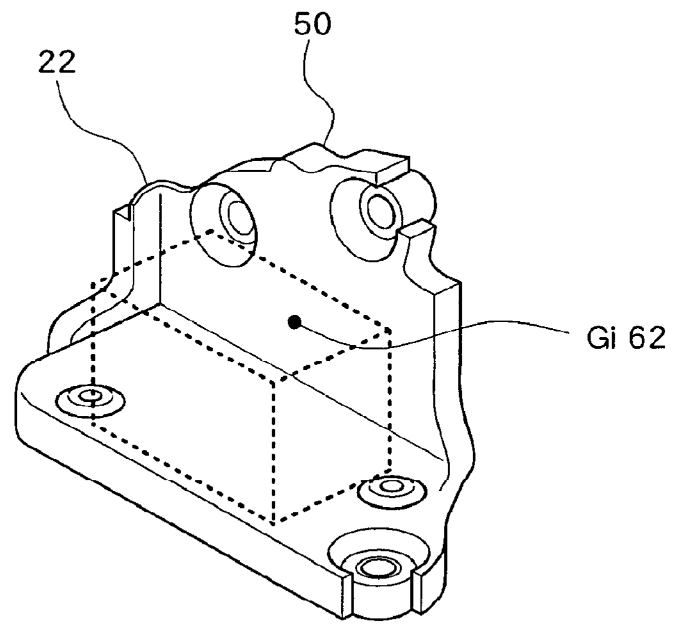
FIG. 3B is a perspective view of the fixture to which the negative relay has been fixed.

FIG. 3B is a perspective view of the fixture 50 to which the negative relay 22, shown by dotted lines, has been fixed.

Figure 4:
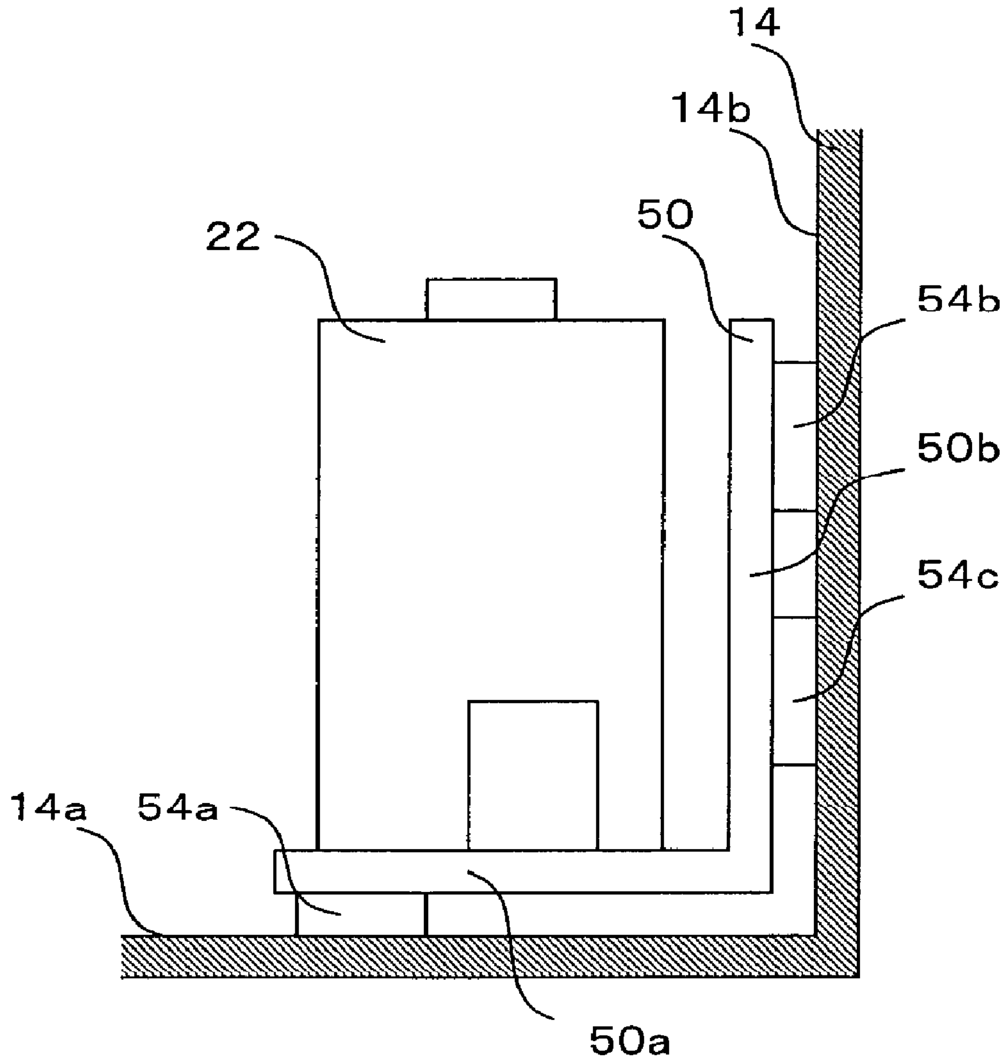
FIG. 4 is a schematic view showing the negative relay attached to the lower case 14 via the fixture.

FIG. 4 is a schematic view showing the negative relay 22 attached to the lower case 14 via the fixture 50 as viewed from the direction of A in FIG. 1.

Hereinafter, the fixture 50 will be described with reference to FIGS. 3A, 3B, and 4.

The fixture 50 has an L shape from a base fixture 50*a* attached to the top of the bottom face of the lower case 14 on the inner surface of the case and a side fixture 50*b* attached to the inner side surface of the lower case 14 on the inner surface of the case. On the base fixture 50*a* is formed a pair of screw mounts 52*a* on a diagonal line for fixing the negative relay 22. Furthermore, on the base fixture 50*a* is formed one mounting point 56*a*. On the mounting point 56*a* is attached a rubber sleeve 54*a*, which is a shock absorbing member, and the base fixture 50*a* is fixed on the top of the bottom face of the lower case 14 via the rubber sleeve 54*a*. Furthermore, on the side fixture 50*b* are formed two mounting points 56*b*, 56*c*. On the mounting points 56*b*, 56*c* are also attached rubber sleeves 54*b*, 54*c*, and the side fixture 50*b* is fixed to the inner side surface of the lower case 14 via the rubber sleeves 54*b*, 54*c*. It is preferable to select an elastic material for the rubber sleeves having sufficient vibration absorptivity with respect to the direction of operation Z (axial direction) of the movable core 1*b*. More specifically, a material such as ethylene propylene diene terpolymer (EPDM), butyl rubber, or silicon rubber can be used for the rubber sleeves.

Selecting the rubber sleeves in this manner can effectively absorb the shock vibrations generated when the movable core 1*b* forming the negative relay 22 strikes the bottom face of the case 1*d*.

In the embodiment, the negative relay 22 is fixed to an inner side surface 14*b* of the lower case 14 in addition to the top of the bottom face 14*a* of the lower case 14. As a result, the impact vibrations generated from the on/off operation of the negative relay 22 are dispersed and transmitted to the two surfaces so that the impact vibrations can be effectively attenuated. Furthermore, the vibrations of the negative relay 22 can be effectively attenuated even if the negative relay 22 vibrates due to external factors.

It is preferable to form the mounting points 56*a*, 56*b*, 56*c* on the base fixture 50*a* or the side fixture 50*b* so that a center of gravity Gi 60 of a polygon having the mounting points 56*a*, 56*b*, 56*c* as vertices coincides with a center of gravity Gi 62 of the relay unit including the negative relay 22 and the fixture 50. As a result, the relay unit is fixed in a stable manner to the lower case 14 and the impact vibrations of the negative relay 22 can be effectively attenuated. Hereinabove, the center of gravity Gi 60 and the center of gravity Gi 62 coincide. However, if the center of gravity Gi 60 and the center of gravity Gi 62 are in proximity to each other, the shock vibrations can be suppressed to a certain extent so that the center of gravity Gi 60 and the center of gravity Gi 62 need not necessarily coincide exactly. Namely, if the center of gravity Gi 62 is located as least within the polygon formed by the mounting points 56*a*, 56*b*, 56*c*, the shock vibrations can be effectively suppressed.

Furthermore, it is preferable to have a higher quantity of mounting points formed on the side fixture 50*b* rather than on the base fixture 50*a*. In other words, it is preferable to have a higher quantity of mounting points on the side fixture 50*b*, which is a surface parallel to the direction of operation Z of the movable core 1*b* forming the negative relay 22, rather than on the base fixture 50*a*, which is a surface perpendicular to the direction of operation Z. It is easier to dissipate and to absorb the energy generated from impact with the impact vibrations of the movable core 1*b* transmitted to a surface parallel to the direction of operation Z of the movable core 1*b* rather than to a surface perpendicular to the direction of operation Z. As a result, increasing the quantity of mounting points formed on the side fixture 50*b* can effectively attenuate the impact vibrations of the negative relay 22. It should be noted that a higher quantity than the aforementioned quantity of mounting points may be formed on the base fixture 50*a* and the side fixture 50*b*.

The effect when fixing the relay to the lower case using the fixture 50 relating to the embodiment will be further described with reference to FIGS. 5A to 5D.

Figure 5A:
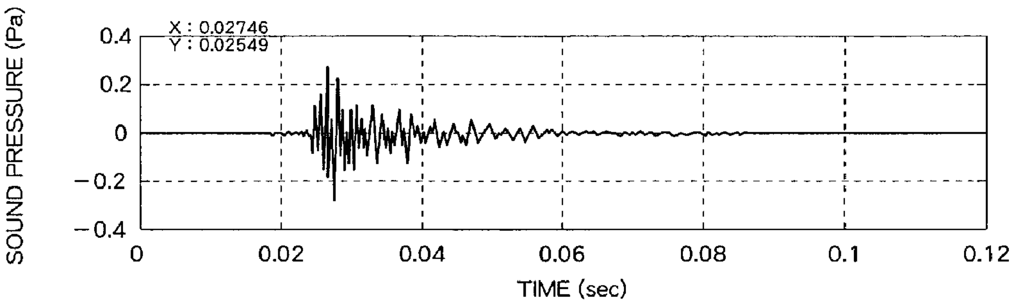
FIG. 5A shows the measured result of sound pressure (Pa) as a sound pressure waveform when the relay is turned on and off with the relay fixed directly only onto the top of the bottom face of the lower case without the fixture.

FIG. 5A shows the measured result of sound pressure (Pa) as a sound pressure waveform when the relay is turned on and off with the relay fixed directly only onto the top of the bottom face of the lower case without the fixture.

Figure 5B:
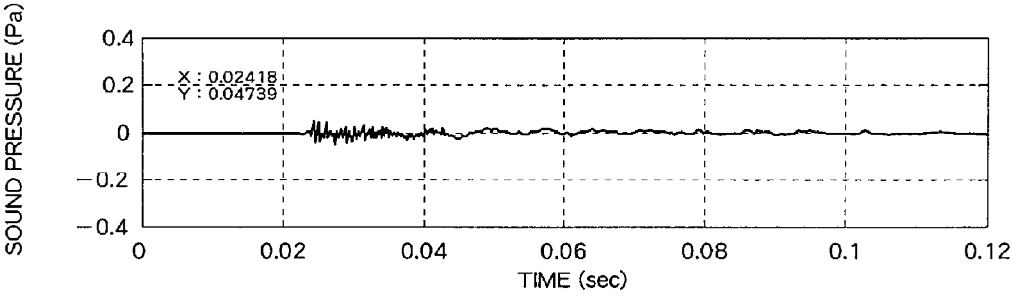
FIG. 5B shows the measured result of sound pressure (Pa) as a sound pressure waveform when the relay is turned on and off with the relay fixed only onto the top of the bottom face of the lower case via a conventional fixture provided with a shock absorbing member.

FIG. 5B shows the measured result of sound pressure (Pa) as a sound pressure waveform when the relay is turned on and off with the relay fixed only onto the top of the bottom face of the lower case via a conventional fixture provided with a shock absorbing member.

Figure 5C:
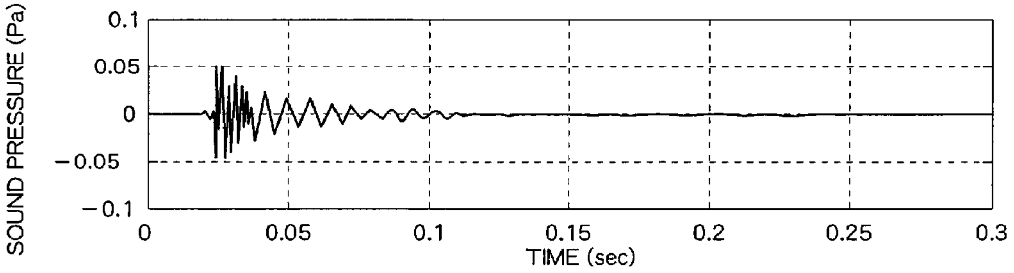
FIG. 5C shows the measured result of sound pressure (Pa) as a sound pressure waveform when the relay is turned on and off with the relay fixed only onto the top of the bottom face of the lower case via a conventional fixture provided with a shock absorbing member.
Figure 5D:
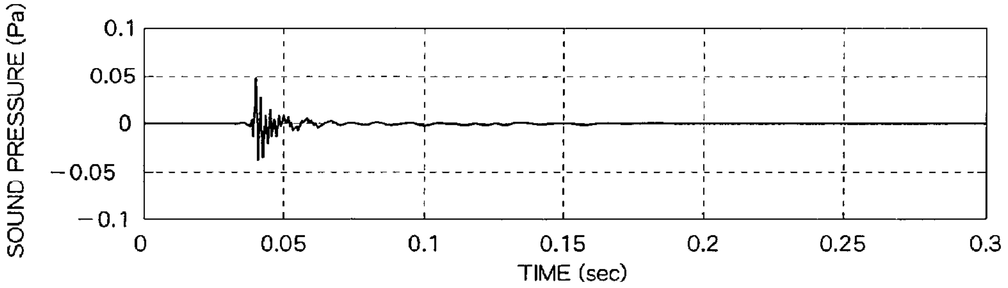
FIG. 5D shows the measured result of sound pressure (Pa) as a sound pressure waveform when the relay is turned on and off with the relay fixed to the top of the bottom face and to the inner side surface of the lower case via the fixture relating to the embodiment.

FIG. 5C shows the measured result identical to that of FIG. 5B with the abscissa (sound pressure) and the ordinate (time) adjusted to match the scale of FIG. 5D.

FIG. 5D shows the measured result of sound pressure (Pa) as a sound pressure waveform when the relay is turned on and off with the relay fixed to the top of the bottom face and the inner side surface of the lower case via the fixture 50 relating to the embodiment.

As shown in FIGS. 5A to 5D, noise can be effectively attenuated when the relay is fixed to the lower case using the fixture 50 relating to the embodiment compared to when not using the fixture 50. Furthermore, the duration of noise is short when the fixture 50 is used compared to when the fixture 50 is not used and the noise can be suppressed in a short period of time. This effect is obtained from the stability between the relay and the fixture by having the center of gravity Gi 60 of the polygon having the mounting points as vertices coincide with the center of gravity Gi 62 of the relay and the fixture (namely, the center of gravity of the relay unit) as described above.

According to the embodiment, fixing the L-shaped fixture to the top of the bottom face 14*a* and the inner side surface 14*b* of the lower case and fixing the relay to the fixture fixes the relay to the lower case in a stable manner. As a result, the impact vibrations generated when the relay operates can be suppressed to reduce noise.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A battery pack mounted in a vehicle comprising:

a battery pack;

a relay unit for relaying current output from said battery pack; and a case for housing said battery pack and said relay unit;

said relay unit has at least three mounting points for securing at least two inner surfaces of said case via a shock absorbing member;

the center of gravity of said relay unit is located inside a polygon having said mounting points as vertices.

2. A battery pack according to claim 1, wherein:

the center of gravity of said polygon and the center of gravity of said relay unit coincide.

3. A battery pack according to claim 1, wherein:

said relay unit includes a mechanical relay for opening and closing contacts by a drive shaft sliding in a shaft direction;

said inner surface to which said relay unit is fixed includes a surface perpendicular with said shaft direction and a surface parallel to said shaft direction; and a quantity of mounting points for fixing to the surface parallel to said shaft direction is greater than a quantity of mounting points for fixing to the surface perpendicular to said shaft direction.

4. A battery pack according to claim 1, wherein:

said relay unit comprises an L-shaped fixture and is fixed to an inner surface of said case via said fixture.

* * * * *